(12) United States Patent
Tabet et al.

(10) Patent No.: US 10,034,271 B2
(45) Date of Patent: Jul. 24, 2018

(54) DECODING OF PCFICH IN LTE FOR POWER SAVINGS AND RANGE IMPROVEMENT

(71) Applicant: Apple Inc., Cupertino, CA (US)

(72) Inventors: Tarik Tabet, Los Gatos, CA (US); Konstantinos Sarrigeorgidis, Sunnyvale, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 14/726,771

(22) Filed: Jun. 1, 2015

(65) Prior Publication Data
US 2015/0365930 A1 Dec. 17, 2015

Related U.S. Application Data

(60) Provisional application No. 62/012,246, filed on Jun. 13, 2014.

(51) Int. Cl.
*H04W 72/04* (2009.01)
*H04L 5/00* (2006.01)
*H04B 17/336* (2015.01)

(52) U.S. Cl.
CPC ...... *H04W 72/0406* (2013.01); *H04B 17/336* (2015.01); *H04L 5/0007* (2013.01);
(Continued)

(58) Field of Classification Search
CPC ............. H04W 72/0406; H04B 17/336; H04L 5/0094; H04L 5/0007; H04L 5/0053; H04L 5/0091
See application file for complete search history.

(56) References Cited

U.S. PATENT DOCUMENTS 9,742,516 B2 * 8/2017 Song ................... H04J 11/0059
9,860,049 B2 * 1/2018 Li ......................... H04L 5/0092
(Continued)

FOREIGN PATENT DOCUMENTS

EP        2424320 A1     7/2009
EP        2811675 A1    10/2014
(Continued)

OTHER PUBLICATIONS

International Search Report & Written Opinion, Application No. PCT/US2015/033508, dated Oct. 12, 2015, 16 pages.
(Continued)

*Primary Examiner* — Hashim Bhatti
(74) *Attorney, Agent, or Firm* — Meyertons Hood Kivlin Kowert & Goetzel, P.C.; Jeffrey C. Hood

(57) ABSTRACT

A mobile device (UE) may decode the Physical Control Format Indicator Channel (PCFICH) blindly, which may include obtaining resource elements (REs) that are reserved for the Physical Downlink Control Channel (PDCCH), based on a largest value of a control format indicator (CFI), finding a total number of control channel elements (CCEs) according to the obtained REs, numbering the CCEs, and decoding the PDCCH for the largest value of the CFI over the numbered CCEs. Accordingly, the UE does not need to decode the PCFICH) specifically. In some cases, the UE may indicate to the network that it is a constrained device, and the network may transmit control information using a reserved CFI value in response to the indication that the UE is a constrained device. The UE may then not decode the PCFICH, and decode the PDCCH based on the PDCCH occupying a first four OFDM symbols.

20 Claims, 7 Drawing Sheets

(52) U.S. Cl.
CPC .......... *H04L 5/0053* (2013.01); *H04L 5/0094* (2013.01); *H04L 5/0091* (2013.01)

(56) References Cited

U.S. PATENT DOCUMENTS

| | | | |
|---|---|---|---|
| 9,893,863 B2* | 2/2018 | Takeda | H04L 5/0055 |
| 2010/0087203 A1* | 4/2010 | Lee | H04W 72/082 |
| | | | 455/452.2 |
| 2012/0088517 A1* | 4/2012 | On | H04W 16/10 |
| | | | 455/452.1 |
| 2012/0163334 A1* | 6/2012 | Miki | H04L 5/0053 |
| | | | 370/330 |
| 2012/0250523 A1* | 10/2012 | Miki | H04L 1/1812 |
| | | | 370/242 |
| 2013/0028199 A1* | 1/2013 | Song | H04W 16/12 |
| | | | 370/329 |
| 2013/0188592 A1* | 7/2013 | Yang | H04L 5/00 |
| | | | 370/329 |
| 2013/0242824 A1 | 9/2013 | Lee et al. | |
| 2014/0092827 A1 | 4/2014 | Jongren et al. | |
| 2014/0187263 A1* | 7/2014 | Geng | H04J 11/0056 |
| | | | 455/456.1 |
| 2014/0254521 A1* | 9/2014 | Fong | H04L 5/0053 |
| | | | 370/329 |
| 2014/0321399 A1 | 10/2014 | Liu et al. | |
| 2015/0003364 A1 | 1/2015 | Kim et al. | |
| 2015/0023331 A1 | 1/2015 | You et al. | |
| 2016/0007361 A1* | 1/2016 | Andersson | H04L 5/0053 |
| | | | 370/329 |

FOREIGN PATENT DOCUMENTS

| | | | |
|---|---|---|---|
| WO | WO 2013/023517 | * | 2/2013 |
| WO | 2013115519 A1 | | 8/2013 |
| WO | 2014007699 A1 | | 1/2014 |

OTHER PUBLICATIONS

Invitation to pay Additional Fees, International Application No. PCT/US2015/033508, dated Aug. 6, 2015, 5 pages.

* cited by examiner

PCFICH Specs in 3GPP

Table 5.3.4-1: CFI Codewords

| CFI | CFI Codeword <$b_0, b_1, ..., b_{31}$> |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0,> |
| 3 | <1,1,0,1,1,0,1,1,0,1,1,0,1,1,0,1,1,0,1,1,0,1,1,0,1,1,0,1,1,0,1,1,> |
| 4 (Reserved) | <0,0,0,0,0,0,0,0,0,0,0,0,0,0,0,0,0,0,0,0,0,0,0,0,0,0,0,0,0,0,0,0,> |

FIG. 5
(Prior Art)

DECODING OF PCFICH IN LTE FOR POWER SAVINGS AND RANGE IMPROVEMENT

PRIORITY CLAIM

This application claims benefit of priority of U.S. Provisional Patent Application Ser. No. 62/012,246 titled "Improved Decoding of PCFICH in LTE for Power Saving and Range Improvement", filed on Jun. 13, 2014, which is hereby incorporated by reference as though fully and completely set forth herein.

FIELD OF THE INVENTION

The present application relates to wireless communication devices, and more particularly to apparatuses, systems, and methods for providing improved decoding of PCFICH in LTE among wireless communications devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

In wireless data communications, automatic repeat request (ARQ; also referred to as automatic repeat query), is used as an error-control method for data transmission that uses acknowledgements (messages sent by the receiver indicating that it has correctly received a data frame or packet) and timeouts (specified time periods allowed to elapse before an acknowledgment is received) to achieve reliable data transmissions. If the sender does not receive an acknowledgment before the timeout, it usually re-transmits the frame/packet until the acknowledgment is received, or the number of re-transmissions has exceeded a predefined limit.

Hybrid automatic repeat request (HARD) is a combination of high-rate forward error-correcting coding and ARQ error-control. In standard ARQ, redundant bits are added to the data to be transmitted using an error-detecting code such as a cyclic redundancy check (CRC), with receivers detecting a corrupted message requesting a new message from the sender. In Hybrid ARQ, the original data is encoded with a FEC (forward error correction or forward error coding) code, and the parity bits are either immediately transmitted along with the message, or they are transmitted only upon request by a receiver that has detected an erroneous message. The FEC code is typically used to correct an expected subset of all errors that may occur, while the ARQ provides a fallback to correct errors that cannot be corrected through the use of only the redundancy included in the initial transmission. Therefore, hybrid ARQ offers better performance in poor signal conditions, but at the expense of significantly lower throughput during good signal conditions. A signal quality crossover point may be defined, below which simple HARQ may be preferred, and above which basic ARQ may be used.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines three physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

The Physical Hybrid ARQ Indicator Channel (PHICH) is a DL control channel that carries the HARQ acknowledge/negative-acknowledge (ACK/NACK), indicating to the UE whether the eNB correctly received uplink user data carried on the PUSCH. Information over the PHICH is typically BPSK (binary phase shift keying) modulated.

The Physical Control Format Indicator Channel (PCFICH) is a DL control channel that carries the Control format Indicator (CFI) which includes the number of orthogonal frequency-division multiplexing (OFDM) symbols used for control channel transmission in each subframe (typically 1, 2, or 3). The 32-bit long CFI is mapped to 16 Resource Elements in the first OFDM symbol of each downlink frame using QPSK modulation.

Therefore, as indicated above, during data communication over LTE, the DL uses the physical channel PDSCH, while in UL it uses the UL channel PUSCH. As also mentioned above, these two channels convey the transport blocks of data in addition to some MAC control and system information. To support the transmission of DL and UL transport channels, Downlink Shared Channel (DLSCH) and Uplink Shared Channel (UL-SCH) control signaling is required. This control information is sent in PDCCH and it contains DL resource assignment and UL grant information. PDCCH is sent in the beginning of every subframe in the first OFDM symbols. Depending on the level of robustness and the PDCCH system capacity (numbers of users to be simultaneously served in a TTI) the NW needs to achieve, PDCCH will be transmitted in either the first 1, 2, 3, or 4 OFDM symbols of a subframe. The number of OFDM symbols used in PDCCH is signaled in PCFICH. If the device is range constrained or in bad coverage, a mechanism to alleviate the effect of bad reception of PCFICH is desired.

SUMMARY OF THE INVENTION

Embodiments described herein relate to a User Equipment (UE) device, base station, and/or relay station, and associated method for improved Physical Control Format Indicator Channel (PCFICH) decoding for power saving and range improvement during wireless communications, e.g. during Long Term Evolution (LTE) communications and transmissions. In one set of embodiments, a UE may decode PCFICH as follows. The UE may obtain the Resource Elements (REs) that are reserved for Physical Downlink Control Channel (PDCCH), based on a largest value of the Control format Indicator (CFI), and may obtain the corresponding total number of Control Channel Elements (CCE), where one CCE corresponds to nine Resource Element Groups (REGs), which correspond to respective thirty six (36) Resource Elements (REs). The UE may number all CCEs, and perform PDCCH blind decoding over all these CCEs. The result may then be determined by checking the Cyclic Redundancy Check (CRC) with all possible Radio Network Temporary Identifiers (RNTIs). In this case the UE does not need to decode the PCFICH, it is decoded blindly, based on the PDCCH occupying the largest value of the CFI in subframes. If the decoding fails, then the UE may further attempt to decode with the next largest value of the CFI, i.e. the largest value of the CFI lower than the value of the CFI for which the decoding failed, and so on and so forth.

By assuming that the CFI has its largest possible value, the complexity of the blind decoding of PCFICH is reduced. Instead of going through all CFI possibilities (e.g., hypotheses) independently, decoding starts with the largest value of the CFI, which encompasses all other CFI cases, and which enables optimized software/hardware (SW/HW) implementation (e.g., reduced memory, reduced number of buffers and reduced number of states in the L1 control) that improves the battery life. Since the device is range constrained, the eNB may be expected to ensure that the UE is able to decode the PDCCH, which in turn leads to a preferably low rate of the PDCCH, which may be achieved by increasing the aggregation level of PDCCH, and by using the largest value of the CFI.

In some embodiments, the blind decoding of the PCFICH may be adaptive. Since the eNB may be expected to always send the PCFICH, the UE may decide when to trigger blind decoding of PCFICH and when to disable it (i.e. decode PCFICH normally). This adaptive decision may be based on different metrics at the UE, like Signal-To-Interference-Plus-Noise Ratio (SINR), Channel Quality Indicator (CQI), Reference Signal Received Power (RSRP), and/or Reference Signal Strength Indicator (RSSI). For example, if the SINR<0 dB, the UE may perform blind decoding of the PCFICH.

In alternate embodiments, a change to the network specification may be implemented to improve decoding of control information. Specifically, the CFI4—which is currently reserved in the specification—may be specified to be used for all these new types of devices. A mechanism (at the Radio Resource Control—RRC—level) to indicate to the network (NW) that the device is range constrained may be put in place for every RRC connection. The eNB may then group together all these types of devices as "range constrained" devices when sending control information. In these particular subframes the eNB may use CFI=4 (CF4), in which case the UE does not need to decode PCFICH, and while decoding PDCCH it may always decode PDCCH based on the PDCCH occupying the first four (4) Orthogonal Frequency-Division Multiplexing (OFDM) symbols.

In accordance with at least the above, a method for decoding control format information during wireless communications within a wireless network (NW) may include a user equipment (UE) obtaining resource elements (REs) that are reserved for PDCCH, based on a largest value of the CFI. The method may further include finding a total number of CCEs according to the obtained REs, numbering the CCEs, and decoding the PDCCH for the largest value of the CFI over the numbered CCEs. These actions may be performed in lieu of standard decoding of a PCFICH. Furthermore, a result of the decoding may be determined according to a cyclic redundancy code check with all possible RNTIs. In addition, the method may include making an adaptive determination whether or not to perform standard decoding of a PCFICH, and performing the obtaining of the resource elements (REs), finding the total number of CCEs, numbering the CCEs, and decoding the PDCCH responsive to the adaptive determination.

In some embodiments the adaptive determination includes indicating to the NW that the UE is a constrained device, and the NW in turn sending control information using a reserved control format indicator value corresponding to the UE being indicated as a constrained device. In yet another set of embodiments, the adaptive determination is based on one or more specified metrics at the UE, which may include Signal-To-Interference-Plus-Noise Ratio, Channel Quality Indicator, Reference Signal Received Power, and/or Reference Signal Strength Indicator.

In further accordance with the above, a wireless communication system may include a wireless communications device that establishes communications within a wireless network (NW), and indicates to the NW that the wireless communications device is a constrained device. The device may then receive control information from the NW, with the control information including a reserved control format indicator value corresponding to the wireless communications device being indicated as a constrained device. The device in turn may blind decode a PDCCH responsive to the control information. It should be noted that as referred to herein, "blind decoding" or "blind decode" of PCFICH is meant to refer to an alternate procedure to performing a normal or standard decoding of PCFICH (or decoding the PCFICH specifically) as prescribed in the current standards. In other words, a decoding procedure of PCFICH is set forth in current established in standards, which is referred to herein as "normal" or "standard" decoding of PCFICH, or decoding the PCFICH specifically. In contrast, "blind decoding" of PCFICH and/or PDCCH is referred to describe various embodiments disclosed herein whereby PCFICH is not decoded according to the prescribed steps in the current standards, performing alternate decoding steps/functionality as described herein instead.

In some embodiments, to blind decode the PCFICH, the wireless communications device may decode a PDCCH based on the PDCCH occupying a specified first number of OFDM symbols, which may be a highest possible number (currently 4) of OFDM symbols. Furthermore, the control information transmitted by the NW may be representative of all constrained devices being grouped together by the NW. To blind decode the PCFICH, the wireless communications device may obtain REs that are reserved for the PDCCH, based on a largest value of the CFI, find a total number of CCEs according to the obtained REs, number the CCEs, and decode the PDCCH for the largest value of the CFI over the numbered CCEs. The wireless communications device may also determine a result of the decoded PDCCH according to a cyclic redundancy code check with all possible RNTIs.

Further in accordance with the above, a non-volatile memory element may store instructions executable by a processing element to cause a wireless communications device (WCD) to wirelessly communicate over a wireless network (NW). In one set of embodiments, executing the stored instructions causes the WCD to obtain REs that are reserved for PDCCH, based on a largest value of the CFI, and further cause the WCD to find a total number of CCEs according to the obtained REs, number the CCEs, and decode the PDCCH for the largest value of the CFI over the numbered CCEs. The stored instructions may be further executable to cause the WCD to perform the above functions instead of performing a standard (or normal) decoding of a PCFICH. In addition, the stored instructions may be further executable to cause the WCD to determine a result of the decoded PDCCH according to a cyclic redundancy code check with all possible RNTIs.

In some embodiments, the stored instructions are also executable to cause the wireless communications device to make an adaptive determination whether or not to perform standard decoding of a PCFICH, and obtain the REs, find the total number of CCEs, number the CCEs and decode the PDCCH responsive to the adaptive determination. Making the adaptive determination may include the stored instructions being executed to cause the WCD to indicate to the NW that the WCD is a constrained device, and receive, from the NW, control information that includes a reserved control format indicator value corresponding to the wireless communications device being indicated as a constrained device. In some embodiments the stored instructions may also be executable to cause the wireless communications device to make the adaptive determination based on one or more specified metrics, which may include SINR, CQI, RSRP, and/or RSSI.

BRIEF DESCRIPTION OF THE DRAWINGS

FIG. 5 shows a table with the PCFICH codewords in the current 3GPP specification, according to prior art;

Figure 1:
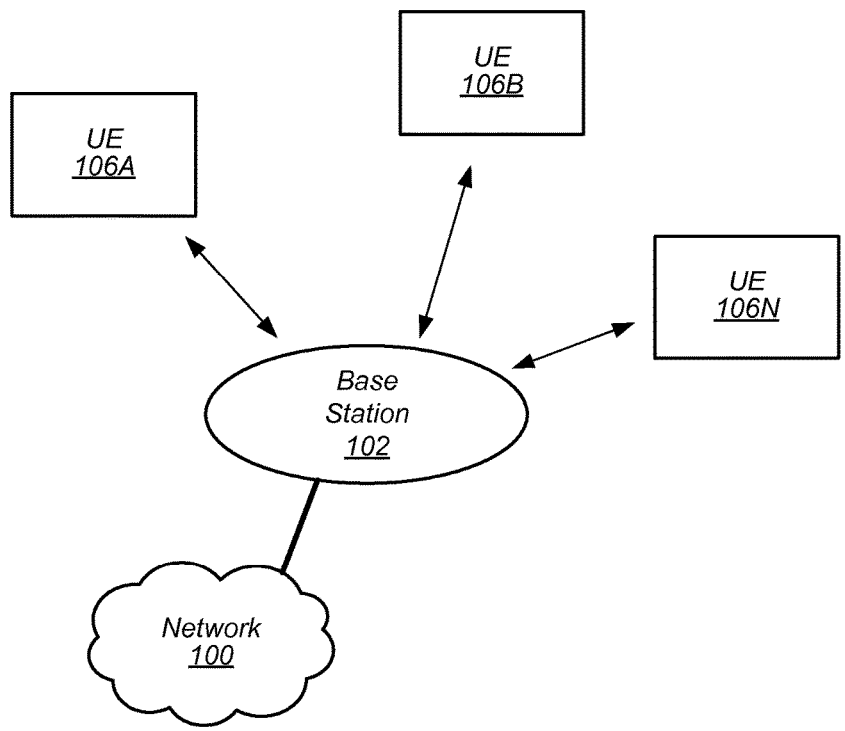
FIG. 1 illustrates an exemplary (and simplified) wireless communication system according to one set of embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge
ARQ: Automatic Repeat Request (also: Automatic Repeat Query)
BPSK: Binary Phase-Shift Keying
BS: Base Station
CCE: Control Channel Elements
CFI: Control format Indicator
CQI: Channel Quality Indicator
CRC: Cyclic Redundancy Check
DCI: Downlink Control Information
DL: Downlink (from BS to UE)
DLSCH: Downlink Shared Channel
FDD: Frequency Division Duplexing
FEC: Forward Error Correction
GPS: Global Positioning System
GSM: Global System for Mobile Communication
HARQ: Hybrid Automatic Repeat Request
LTE: Long Term Evolution
MAC: Media Access Control (layer)
MIMO: Multiple-In Multiple-Out
NACK: Negative Acknowledge
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel
PDU: Protocol Data Unit
PHICH: Physical HARQ Indicator Channel
PUSCH: Physical Uplink Shared Channel
PHY: Physical (Layer)
QPSK: Quadrature Phase-Shift Keying
REG: Resource Element Group
RNTI: Radio Network Temporary Identifiers
RRC: Radio Resource Control
RSRP: Reference Signal Received Power
RSSI: Reference Signal Strength Indicator
RX: Reception
SINR: Signal-To-Interference-Plus-Noise Ratio
TB: Transport Blocks
TDD: Time Division Duplexing
TTI: Transmission Time Interval
TX: Transmission
UE: User Equipment
UL: Uplink (from UE to BS)
ULSCH: Uplink Shared Channel
UMTS: Universal Mobile Telecommunication System Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable electronic devices (e.g. Apple Watch™, Google Glass™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DCI—refers to downlink control information. There are various DCI formats used in LTE in PDCCH (Physical Downlink Control Channel). The DCI format is a predefined format in which the downlink control information is packed/formed and transmitted in PDCCH.

Figure 2:
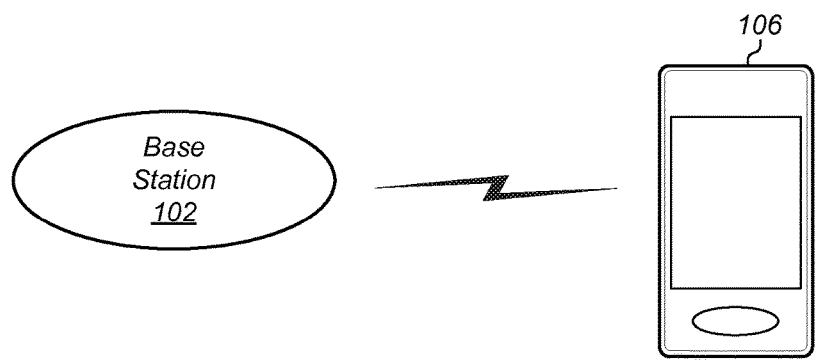
FIG. 2 illustrates a base station in communication with a wireless user equipment (UE) device according to one set of embodiments.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network (NW) insofar as uplink and downlink communications of the UE are concerned. Thus, a UE communicating with one or more base stations in the network (NW) may also be interpreted as the UE communicating with the NW.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 according to improved UL and DL decoupling methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments of improved decoding of PCFICH described herein, or any portion of any of the method embodiments of improved decoding of PCFICH described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and Bluetooth. Other configurations are also possible.

Figure 3:
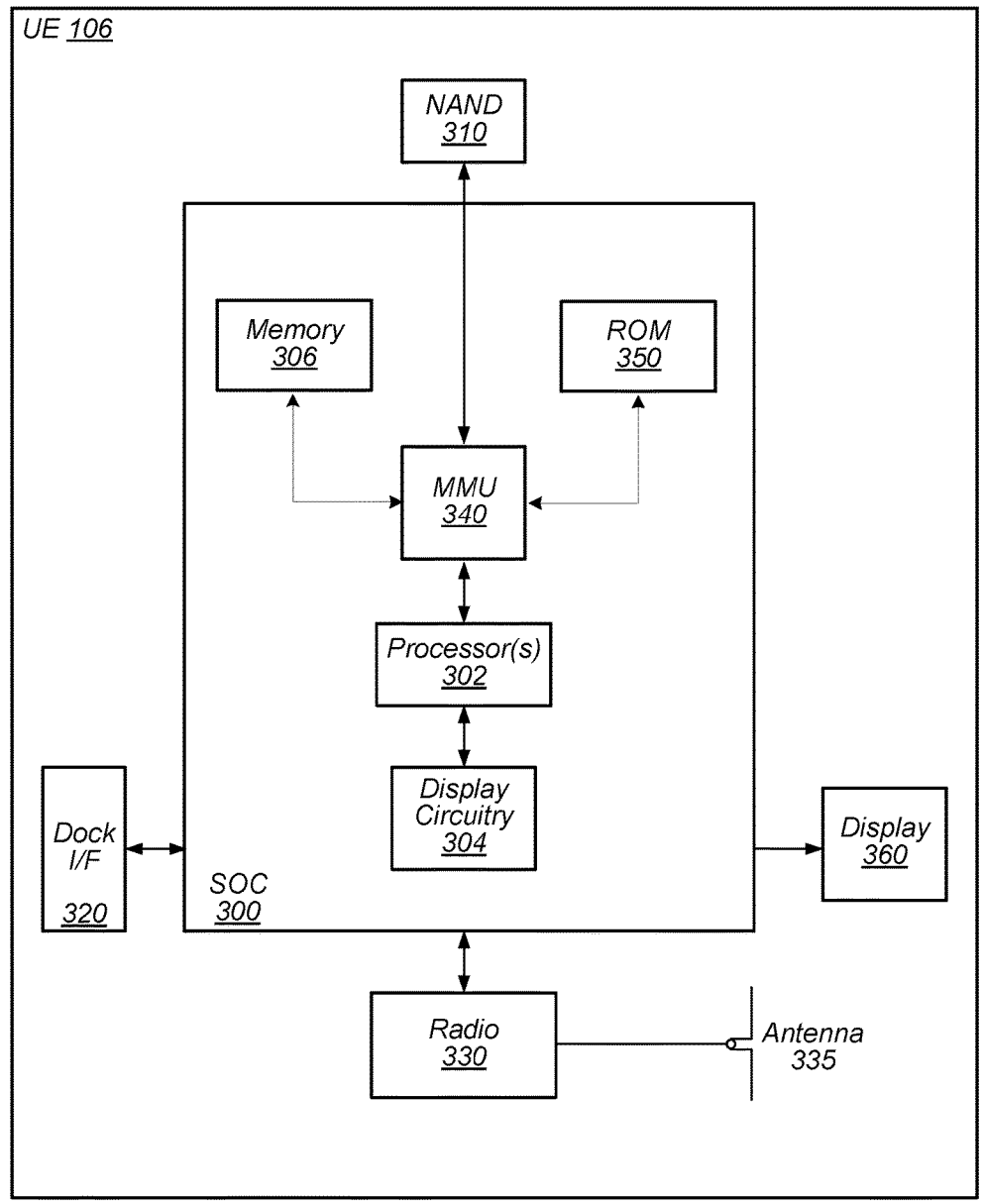
FIG. 3 illustrates an exemplary block diagram of a UE, according to one set of embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, Bluetooth, Wi-Fi, GPS, etc.). The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 (and base station 102) may include hardware and software components for implementing a method for improved decoding of PCFICH. The processor 302 of the UE device 106 may be configured to implement part or all of the methods of improved decoding of PCFICH described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components, such as Radio 330, as shown in FIG. 3, to implement improved decoding of PCFICH according to various embodiments disclosed herein.

Figure 4:
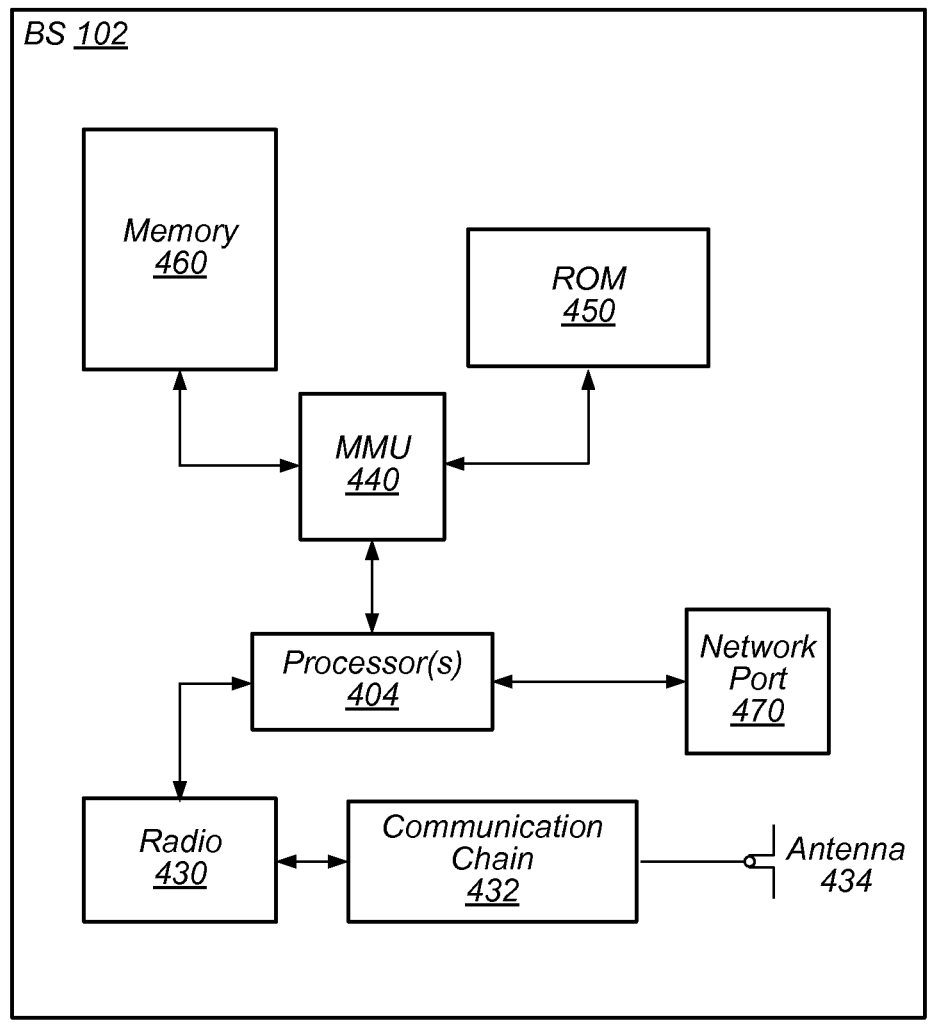
FIG. 4 illustrates an exemplary block diagram of a base station according to one set of embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor 404 of the base station 102 may be configured to implement part or all of the methods described herein for improved decoding of PCFICH, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Overall, the various components (460, 450, 440, 404, 430, 432, 470 and 434) of BS 102 may interoperate to implement at least part or all of the methods described herein for improved decoding of PCFICH.

Improved Decoding of PCFICH

As previously mentioned, it is desirable to alleviate the effects of poor reception of PCFICH, for example when the device is range constrained or situated in a poor coverage area, in order to provide an improved decoding of PCFICH. Therefore, various embodiments described herein relate to a UE, base station, and/or relay station, and associated method for improved decoding of PCFICH in LTE (long term evolution) for power saving and range improvement during wireless communications, e.g. during LTE communications and transmissions.

Figures 6, 7:
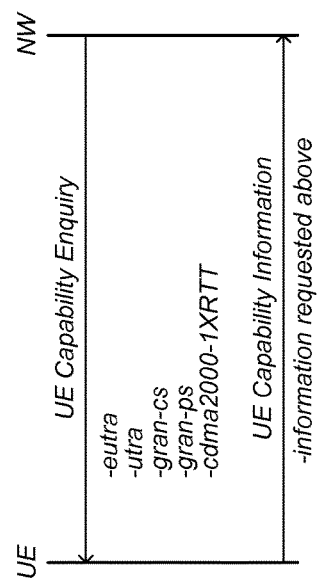
FIG. 6 illustrates an example of PCFICH allocation according to one set of embodiments.
FIG. 7 shows a diagram illustrating how a constrained device indication is provided by a UE to a NW according to one set of embodiments.

FIG. 5 shows a table with the PCFICH codewords in the current 3GPP specification, according to prior art. As seen in FIG. 5, PCFICH contains 32 bits, and may take values 1, 2, 3 if the system bandwidth (BW) is more than 10 resource blocks (RBs), otherwise it is CFI+1 if the system BW is less than 10 RBs. FIG. 6 illustrates an example of PCFICH allocation according to one set of embodiments. As shown in FIG. 6, allocation is for 1.4 MHz, CFI=2 (CF2), with PDCCH on three (3) OFDM symbols. The UE extracts the resource element that contains the PCFICH, decodes the PCFICH, and reads the values. Some of the resource blocks shown in FIG. 6 may also be used for TDD uplink, TDD guard period in special subframe, and MBSFN (Multicast/Broadcast over Single Frequency Network) region—available for PMCH (physical Multitask Channel).

As explained above, PCFICH does not support channel coding, and its performance might be degraded in case of range-constrained devices. It can therefore create a bottleneck when decoding any control or shared channel (PD-CCH/PDSCH). In one set of embodiments, the UE may be operated to blindly try to decode the CFI, i.e. the number of PDCCH OFDM symbols. Depending on the system BW, there may only be three (3) CFI candidates (see FIG. 5, CFI candidates 1, 2 or 3). For a system BW of 50 RBs (10 MHz), the UE would typically try to decode PDCCH according to the latter being encoded over one (1), two (2) or three (3) OFDM symbols. However, in order not to have to decode over the entire CFI range, the UE may operate to perform blind decoding of PCFICH as follows. First, the UE may find all the resource elements (REs) that are reserved for PDCCH, based on the largest value of the CFI. That is, the UE may use a CFI value of 3 in the case of 10 MHz, which means three OFDM symbols, then extract all the REs corresponding to that CFI value. Then, based on this information, the UE may compute the number of CCEs. PDCCH is encoded in a group of CCEs, with every CCE corresponding to nine (9) resource element groups (REGs), and there are four subcarriers in each REG, for a total of thirty six (36) REs.

The number of CCEs defines the aggregation level. The higher the number of CCEs, the higher the aggregation level, and the lower the coding rate. For decoding the PDCCH, the format of the DCI is not known, so the UE may blindly decode all the DCIs. Determining whether a specific DCI has been sent or not, may be based on the CRC. Accordingly, the decoding may be reliable for at least the following reasons. In an example case, the NW may send CFI2 but the UE may use CFI3 instead. The lack of OFDM symbols in this case (CFI3 being used while only CFI2 was transmitted by the NW) may be considered as incorrect data being present, and decoding on this OFDM symbol may therefore result in a CRC failure. Subsequently, it may be determined (it may become known) that the value of the CFI was sent on only two (2) OFDM symbols. While this may increase the search space because the PDCCH is in CFI2 while decoding is performed as if PDCCH were in CFI3, it isn't as much a disadvantage as it is to decode each CFI in succession. It should be noted that if PDCCH decoding that is performed based on CFI3 fails, then the UE may attempt to perform PDCCH decoding based on CFI2, with the CCEs of the first two (2) OFDM symbols. Should this decoding also fail, the UE may then perform PDCCH decoding based on CFI1.

To summarize, in a blind decoding of PCFICH, the UE may find all the REs reserved for PDCCH, based on the largest value of the CFI (e.g. 4). The UE may then find the total number of CCEs, number all CCEs and perform PDCCH blind decoding over all these CCEs. The result may be determined by checking the CRC with all possible Radio Network Temporary Identifiers (RNTIs).

By always considering that the value of the CFI is equal to the largest possible value, the complexity of the blind decoding of PCFICH may be reduced. Instead of going through all CFI possibilities (hypothesis) independently, decoding may start with the largest one that encompasses all the other CFI cases. This enables optimized SW/HW implementation (reduced memory, buffers and states in the L1 control) that improves battery life. There are also some practical advantages. Since the device is range constrained, the eNB (or NW) is expected to ensure that the UE is capable of decoding the PDCCH. Hence the coding rate of the PDCCH is expected to be low, which may be achieved by increasing the aggregation level of PDCCH (the maximum in the current spec is 8), and by using the largest value of the CFI.

An extension of the decoding method(s) described above is to make the blind decoding of the PCFICH adaptive. Since the eNB transmits (in some cases always transmits) the PCFICH, the UE may decide when to trigger blind decoding of PCFICH and when to disable it (i.e. decode PCFICH normally). For example, this adaptive approach may be based on different metrics at the UE, like SINR, CQI, RSRP, and RSSI. For example, if the SINR<0 dB, the UE may perform blind decoding of the PCFICH.

Based at least on the above, when a UE is somehow constrained, and therefore cannot reliably detect the PCFICH, the UE may indicate to the NW that it is a constrained device. As previously explained, the devices that are range constrained need a very low-rate encoded PDCCH in order to successfully decode the control information. In order to achieve that, a change in the specification is proposed, according to which the CFI4—currently reserved in the 3GPP specification—may be used for all the new type(s) of devices, i.e. devices reported to the NW as being constrained, for example. In this manner, PCFICH may not need to be decoded by the UE. The NW may be expected to always use CFI=4 for devices designated as being constrained. Alternatively, CFI=3 may be considered as the baseline for PDCCH decoding for this device.

Accordingly, a UE that is constrained may be enabled to provide such an indication to the NW at an early stage. FIG. 7 illustrates one example of how a constrained device indication may be provided by a UE to a NW. Currently, 3GPP specifies only categories 0-10, and therefore any other UE category value beyond 10 may be used to identify the UE. Through the previously reserved category (beyond category 10), the UE may indicate to the network that the device is a constrained device. Once it has been ascertained that the device is a constrained device, and this has been communicated to the NW, the NW (or eNB) may proceed to group all devices of the specified type (e.g. range constrained devices) when sending control information. More specifically, in these particular subframes the eNB may use CFI=4. The UE then does not need to decode PCFICH, and while decoding PDCCH it may always base the decoding on PDCCH occupying the first four OFDM symbols. This solution therefore proposes a change in the specification (i.e. a change in the way the NW is expected to operate). The proposed specification change obviates the need for decoding PCFICH altogether for devices of a specific type (e.g. devices that are range constrained). In other words, for devices indicated to be constrained, CFI is proposed to be fixed, not dynamic, and have a specified value, e.g. the highest possible value, which is 4 as of now.

Accordingly, the network may use a new information element in the radio resource control (RRC) Connection Reconfiguration message that follows the exchange of UE capability information. Specifically, the UE Capability Information message may be a natural RRC message that is used to indicate to the NW the nature of the device, and that it supports a default configuration that includes a "UE category". Alternatively, some random access procedure (RACH) preambles may be restricted/dedicated to these constrained devices. By detecting these particular preambles, the NW may recognize that the device is constrained in terms of PCFICH performance. These indications may be generalized for any performance issue related to either DL (downlink) or UL PHY (uplink physical) channel.

Figure 8:
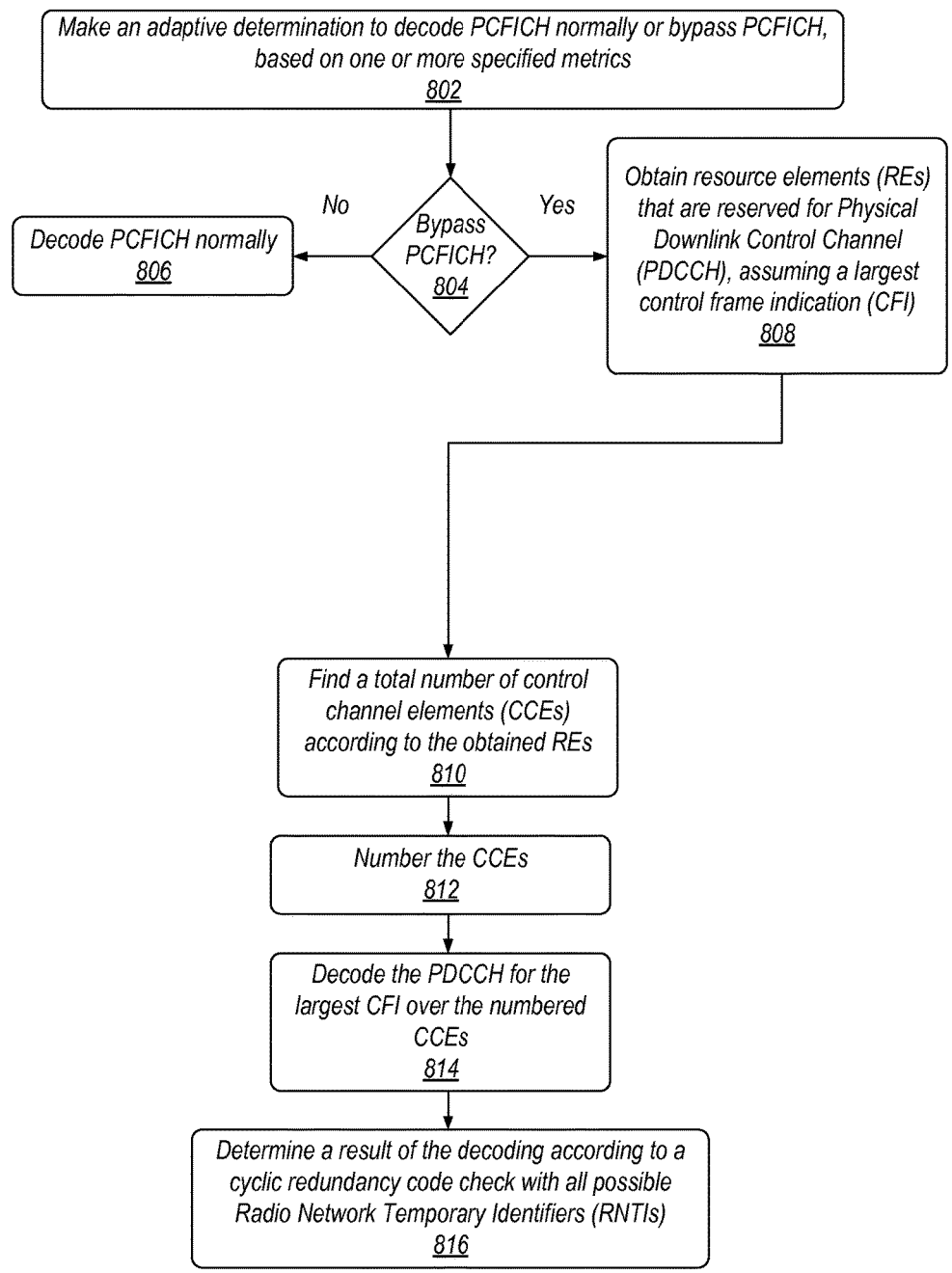
FIG. 8 is a flowchart diagram illustrating wireless communications with improved PCFICH decoding according to one set of embodiments.

FIG. 8 shows a flowchart diagram illustrating wireless communications with improved PCFICH decoding according to one set of embodiments. An adaptive determination may be made whether to decode PCFICH normally or bypass PCFICH, based on one or more specified metrics (802). For example, because the NW transmits the PCFICH, a UE may decide when to bypass decoding PCFICH (also referred to as blind decoding PCFICH) and when to decode PCFICH normally. The one or more specified metrics may include metrics at the UE such as SINR, CQI, RSRP, and RSSI. If the decision is not to bypass decoding PCFICH ("No" branch taken at 804), then PCFICH may be decoded normally (806). If the decision is to bypass PCFICH ("Yes" branch taken at 804, for example if the SINR<0 dB), then REs that are reserved for PDCCH may be obtained, based on a largest value of the CFI (808). A total number of CCEs may then be found (or determined) according to the obtained REs (810), and the CCEs may be numbered (812). Decoding of the PDCCH is then performed for the largest value of the CFI over the numbered CCEs (814). A result of the decoding may then be determined according to a CRC check with all possible RNTIs (816).

Figure 9:
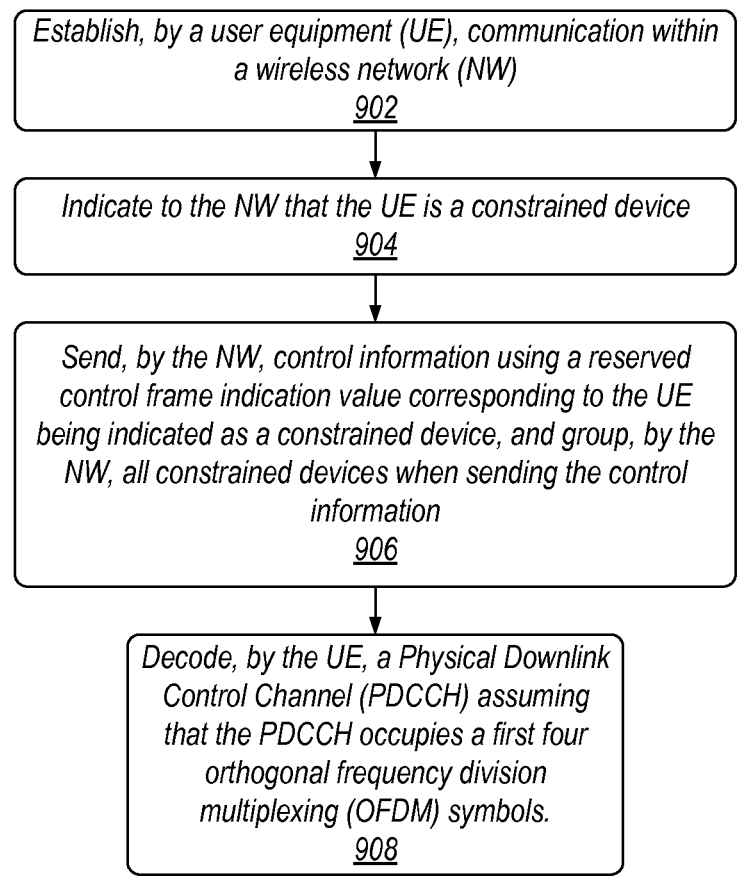
FIG. 9 is a flowchart diagram illustrating wireless communications with designated constrained devices according to one set of embodiments.

FIG. 9 shows a flowchart diagram illustrating wireless communications with designated constrained devices according to one set of embodiments. As noted above, whether to decode PCFICH normally or blindly decode PCFICH (i.e. bypass decoding PCFICH) may be determined based on one or more specified metrics. The determination may also be made based on a newly introduced constrained device type as described above with respect to FIG. 7. Accordingly, a UE may establish communication within a wireless network (902), and may indicate to the network that the UE is a constrained device (904). In alternate embodiments another device may provide the indication to the network that the UE is a constrained device. The network may send control information using a reserved control format indicator value corresponding to the UE being indicated as a constrained device, and may also group all constrained devices when sending the control information (906). The UE may then decode a PDCCH, based on the PDCCH occupying a maximum number of (e.g. first four) orthogonal frequency division multiplexing (OFDM) symbols (908).

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for decoding control format information during wireless communications within a wireless network (NW), the method comprising:
  making a determination whether or not to perform decoding of a Physical Control Format Indicator Channel (PCFICH); and
  in response to the determination indicating that the decoding of the PCFICH is to be bypassed:
    (a) obtaining, by a user equipment (UE), resource elements (REs) that are reserved for a Physical Downlink Control Channel (PDCCH), based on a largest value of a control format indicator (CFI), without decoding the PCFICH corresponding to the PDCCH to obtain an actual value of the CFI;
    (b) finding a total number of control channel elements (CCEs) according to the obtained REs;
    (c) numbering the CCEs; and
    (d) decoding the PDCCH for the largest value of the CFI over the numbered CCEs.

2. The method of claim 1, further comprising:
  determining a reliability of the decoding based on a cyclic redundancy code check with all possible Radio Network Temporary Identifiers (RNTIs).

3. The method of claim 1, further comprising:
indicating to the NW that the UE is a constrained device; and
sending, by the NW, control information using a reserved CFI value corresponding to the UE being indicated as a constrained device, wherein the largest value of the CFI corresponds to the reserved CFI value sent by the NW.

4. The method of claim 3, wherein the reserved CFI value is a fixed value previously specified to be used by both the wireless communication device and the network.

5. The method of claim 1, wherein making the determination comprises making the determination based on one or more specified metrics.

6. The method of claim 5, wherein the one or more specified metrics comprise one or more of the following evaluated at the UE:
Signal-To-Interference-Plus-Noise Ratio;
Channel Quality Indicator;
Reference Signal Received Power; or
Reference Signal Strength Indicator.

7. A communication device comprising:
one or more antennas configured to facilitate wireless communications of the wireless communication device; and
a processor communicatively coupled to the one or more antennas and configured to:
establish communications within a wireless network (NW);
communicate to the NW through the established communications that the wireless communication device is a constrained device;
receive control information from the network, wherein the control information comprises a reserved control format indicator (CFI) value corresponding to the wireless communication device being indicated as the constrained device;
obtain resource elements (REs) that are reserved for Physical Downlink Control Channel (PDCCH), based on the reserved CFI;
find a total number of control channel elements (CCEs) according to the obtained REs;
number the CCEs; and
decode the PDCCH for the reserved value of the CFI over the numbered CCEs.

8. The wireless communication device of claim 7, wherein the processor is configured to decode the PDCCH based on the PDCCH occupying a specified first number of orthogonal frequency division multiplexing (OFDM) symbols.

9. The wireless communication device of claim 7, wherein the reserved CFI value is a fixed value previously specified to be used by both the wireless communication device and the network.

10. The wireless communication device of claim 7, wherein the control information is representative of all constrained devices being grouped together.

11. The wireless communication device of claim 7, wherein the processor is configured to determine a result of the decoded PDCCH according to a cyclic redundancy code check with all possible Radio Network Temporary Identifiers (RNTIs).

12. The wireless communication device of claim 7, wherein the NW is configured to group multiple constrained devices in a same one or more subframes, where a fixed value of the CFI is used.

13. An apparatus comprising:
a memory configured to store information; and
a processor communicatively coupled to the memory and configured to use at least a portion of the stored information to cause a wireless communication device to:
wirelessly communicate over a wireless network (NW);
make a determination whether or not to perform decoding of a PCFICH); and
in response to the determination indicating that the decoding of the PCFICH is to be bypassed:
obtain resource elements (REs) that are reserved for a Physical Downlink Control Channel (PDCCH), based on a largest value of a control format indicator (CFI) without decoding the PCFICH corresponding to the PDCCH to obtain an actual value of the CFI;
find a total number of control channel elements (CCEs) according to the obtained REs;
number the CCEs; and
decode the PDCCH for the largest value of the CFI over the numbered CCEs.

14. The apparatus of claim 13, wherein the processor is configured to further cause the wireless communication device to:
determine a reliability of the decoded PDCCH according to a cyclic redundancy code (CRC) check performed with all possible Radio Network Temporary Identifiers (RNTIs).

15. The apparatus of claim 14, wherein the processor is configured to further cause the wireless communication device to:
attempt to decode the PDCCH with a smaller, next largest value of the CFI, responsive to the CRC check failing for a current value of the CFI for which decoding of the PDCCH was performed.

16. The apparatus of claim 13, wherein the processor is configured to further cause the wireless communication device to:
indicate to the NW that the wireless communication device is a constrained device; and
receive, from the NW, control information that includes a reserved control format indicator value corresponding to the wireless communication device being indicated as the constrained device, wherein the largest value of the CFI corresponds to the reserved CFI value received from the NW.

17. The apparatus of claim 16, wherein the reserved CFI value is a fixed value previously specified to be used by both the wireless communication device and the network.

18. The apparatus of claim 16, wherein the control information is representative of all constrained devices being grouped together.

19. The apparatus of claim 16, wherein the processor is configured to further cause the wireless communication device to make the determination based on one or more specified metrics.

20. The apparatus of claim 19, wherein the one or more specified metrics comprise one or more of the following:
Signal-To-Interference-Plus-Noise Ratio;
Channel Quality Indicator;
Reference Signal Received Power; or
Reference Signal Strength Indicator.

* * * * *